United States Patent
Shimizu et al.

(10) Patent No.: US 11,632,010 B2
(45) Date of Patent: Apr. 18, 2023

(54) INSULATOR SET AND STATOR USED FOR GENERATOR AND ELECTRIC MOTOR, AND METHOD FOR MANUFACTURING STATOR

(71) Applicant: TOYO DENSO KABUSHIKI KAISHA, Tokyo (JP)

(72) Inventors: Naoaki Shimizu, Tsurugashima (JP); Satoshi Yanoi, Tsurugashima (JP); Yoshihiko Koibuchi, Tsurugashima (JP)

(73) Assignee: TOYO DENSO KABUSHIKI KAISHA, Tokyo (JP)

( * ) Notice: Subject to any disclaimer, the term of this patent is extended or adjusted under 35 U.S.C. 154(b) by 177 days.

(21) Appl. No.: 17/023,439

(22) Filed: Sep. 17, 2020

(65) Prior Publication Data
US 2021/0126504 A1  Apr. 29, 2021

(30) Foreign Application Priority Data
Oct. 29, 2019  (JP) ................ JP2019-196225

(51) Int. Cl.
*H02K 3/52* (2006.01)
*H02K 1/14* (2006.01)
*H02K 15/02* (2006.01)
*H02K 15/10* (2006.01)

(52) U.S. Cl.
CPC ............ *H02K 3/522* (2013.01); *H02K 1/146* (2013.01); *H02K 15/022* (2013.01); *H02K 15/10* (2013.01); *H02K 2203/12* (2013.01)

(58) Field of Classification Search
CPC ...... H02K 1/146; H02K 15/022; H02K 15/10; H02K 3/46; H02K 3/522
See application file for complete search history.

(56) References Cited

U.S. PATENT DOCUMENTS

| | | | |
|---|---|---|---|
| 2009/0102311 A1* | 4/2009 | Kotani | H02K 3/345 310/215 |
| 2013/0193800 A1* | 8/2013 | Yokogawa | H02K 3/522 310/215 |
| 2013/0278094 A1* | 10/2013 | Peterson | H02K 1/187 310/68 R |
| 2017/0126090 A1* | 5/2017 | Chen | H02K 3/522 |
| 2019/0157931 A1* | 5/2019 | Shioiri | H02K 15/022 |

FOREIGN PATENT DOCUMENTS

| | | |
|---|---|---|
| IT | MI20110025 A1 | 7/2012 |
| JP | 07-298529 A | 11/1995 |

OTHER PUBLICATIONS

Official Communication issued in corresponding European Patent Application No. 20197951.5, dated Mar. 19, 2021.

* cited by examiner

*Primary Examiner* — Ahmed Elnakib
*Assistant Examiner* — Leda T Pham
(74) *Attorney, Agent, or Firm* — Keating and Bennett, LLP

(57) ABSTRACT

A stator is improved in work efficiency of mounting to a stator core is provided. The stator includes insulators sandwiching the stator core therebetween. The stator core includes a plurality of teeth that radially projects. Each of the insulators includes a plurality of tooth covering portions that radially projects. The tooth covering portions cover the teeth. In a facing portion of one of the insulators facing the stator core, a peripheral portion projects more than a center portion. In a facing portion of the other of the insulators facing the stator core, a center portion projects more than a peripheral portion.

13 Claims, 14 Drawing Sheets

(a)

(b)

INSULATOR SET AND STATOR USED FOR GENERATOR AND ELECTRIC MOTOR, AND METHOD FOR MANUFACTURING STATOR

BACKGROUND OF THE INVENTION

Field of the Invention

The present invention relates to an insulator set and a stator used for a generator and an electric motor, and a method for manufacturing the stator.

Description of the Related Art

As one mode of a stator used for a generator and an electric motor, there is known a stator including a stator core having a plurality of teeth arranged radially and two insulators sandwiching the stator core from above and below (for example, see Japanese Laid-Open Patent Publication (Kokai) No. H07-298529). Each tooth of the stator core is covered with the respective insulators, and a coil wire is wound therearound to form a coil. As a result, the respective insulators is interposed between the tooth and the coil to insulate the tooth from the coil. When the two insulators sandwich the stator core therebetween, insertion portions that project from each insulator cover each tooth, and at this time, each insertion portions is inserted into a slot between two adjacent teeth.

However, in recent years, the number of teeth of a stator core has increased in response to an increase in required electromotive force and required output. Therefore, a slot becomes smaller and ease of insertion of each insertion portion into each slot is lowered. In addition, since the number of slots has increased, when each insertion portion is inserted into each slot, rubbing of each insertion portion and each tooth often occurs, and again, ease of insertion of each insertion portion into each slot is lowered. As a result, work efficiency of mounting two insulators to a stator core is lowered.

SUMMARY OF THE INVENTION

The present invention provides an insulator set for which an insulator improved in work efficiency of being mounted to a stator core is used, a stator, and a method for manufacturing the stator.

Accordingly, an aspect of the present invention provides an insulator set including a first insulator and a second insulator that sandwich a stator core therebetween. The stator core includes a plurality of teeth that radially projects from a center portion of the stator core. The first insulator includes a plurality of first tooth covering portions that radially projects from a center portion of the first insulator. The second insulator has a plurality of second tooth covering portions that radially projects from a center portion of the second insulator. The plurality of first tooth covering portions and the plurality of second tooth covering portions cover the plurality of teeth. In a facing portion of the first insulator that faces the second insulator, a peripheral portion of the first insulator projects more than the center portion of the first insulator. In a facing portion of the second insulator that faces the first insulator, the center portion of the second insulator projects more than a peripheral portion of the second insulator.

According to the present invention, the peripheral portion projects more than the center portion in the facing portion of the first insulator facing the second insulator. Therefore, when the first insulator is mounted to the stator core, first, the peripheral portion is inserted into the stator core, and functions as a guide. Furthermore, the center portion projects more than the peripheral portion in the facing portion of the second insulator facing the first insulator. Therefore, when the second insulator is mounted to the stator core, first, the center portion is inserted into the stator core, and functions as a guide. As a result, work efficiency of mounting the first insulator and the second insulator to the stator core can be improved.

Further features of the present invention will become apparent from the following description of exemplary embodiments (with reference to the attached drawings).

DESCRIPTION OF THE EMBODIMENTS

Hereinafter, an embodiment of the present invention will be described in detail with reference to the drawings.

Figure 1:
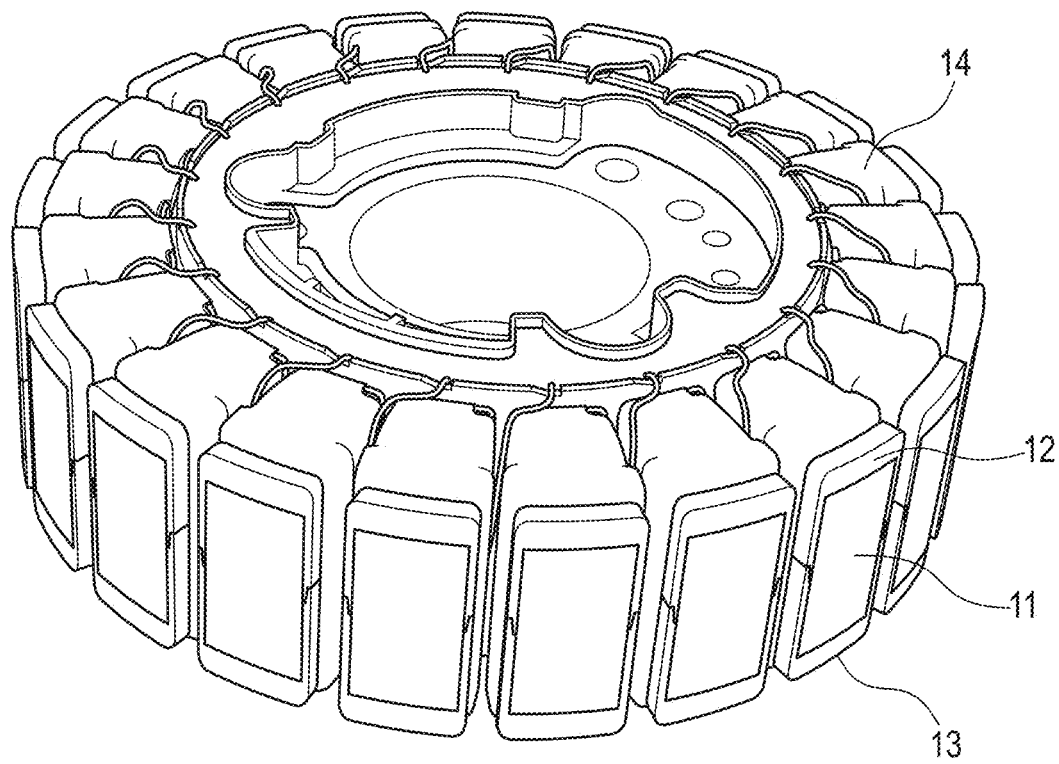
FIG. 1 is a perspective view schematically showing a configuration of a stator according to an embodiment of the present invention.

FIG. 1 is a perspective view schematically showing a structure of a stator according to the present embodiment.

Figure 2:
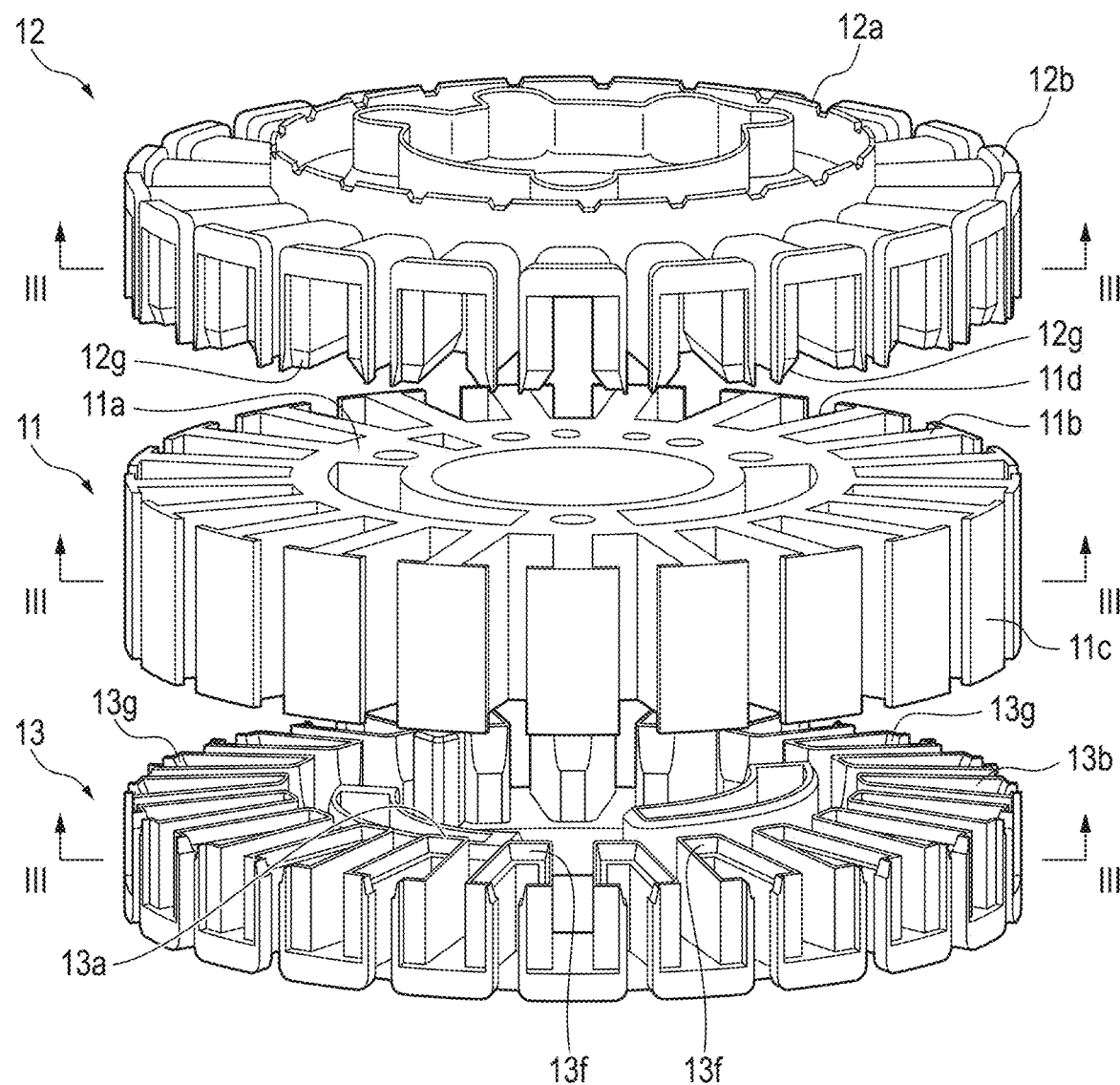
FIG. 2 is an exploded perspective view indicating the configuration of the stator according to the embodiment of the present invention.

FIG. 2 is an exploded perspective view indicating the structure of the stator according to the present embodiment. It should be noted that, in FIG. 2, illustration of a coil 14 described later is omitted.

In FIGS. 1 and 2, a stator 10 includes a stator core 11 and insulators 12, 13 (first insulator, second insulator) that sandwich the stator core 11 therebetween. The stator core 11 is a laminated body of thin metal plates, and includes a center portion 11a that has a substantially cylindrical shape, and teeth 11b, which are a plurality of yokes that projects from the center portion 11a radially with respect to a center axis of the center portion 11a.

The insulator 12 mounted from one side to the stator core 11 includes a center portion 12a and a plurality of tooth covering portions 12b (first tooth covering portions) each having a substantially U-shaped cross section and projecting from the center portion 12a correspondingly to each tooth 11b. Furthermore, the insulator 13 mounted from the other side to the stator core 11 includes a center portion 13a and a plurality of tooth covering portions 13b (second tooth covering portions) each having a substantially U-shaped cross section and projecting from the center portion 13a correspondingly to each tooth 11b. The insulator 12 and the insulator 13 form an insulator set.

When the insulators 12, 13 sandwich the stator core 11 therebetween, the teeth 11b are covered with the tooth covering portions 12b, 13b. A coil wire is wound around the tooth 11b covered with the tooth covering portions 12b, 13b to form the coil 14. Therefore, the tooth covering portions 12b, 13b are interposed between the coil 14 and the tooth 11b, and the tooth 11b is insulated from the coil 14.

The stator 10 is covered with a rotor (not shown) that is a rotatable cover. A plurality of magnets is arranged inside a side wall surface of the rotor so as to face the teeth 11b, respectively. In a case where the stator 10 is used for an electric motor, a magnetic field is generated by energizing each coil 14, and the rotor is rotated around the center axis of the center portion 11a of the stator core 11 due to interaction between the generated magnetic field and the magnetic field of each magnet of the rotor. In a case where the stator 10 is used for a generator, the rotor rotates around the center axis of the center portion 11a of the stator core 11. As a result, an induced current due to the magnetic field of each magnet is generated in each coil 14.

Furthermore, an end portion 11c of each tooth 11b in a radial direction of the stator core 11 is not covered with the tooth covering portion 12b and the tooth covering portion 13b, but is exposed to each magnet of the rotor. As a result, the magnetic field generated by each tooth 11b and the magnetic field generated by each magnet are efficiently interacted with each other.

Figure 3:
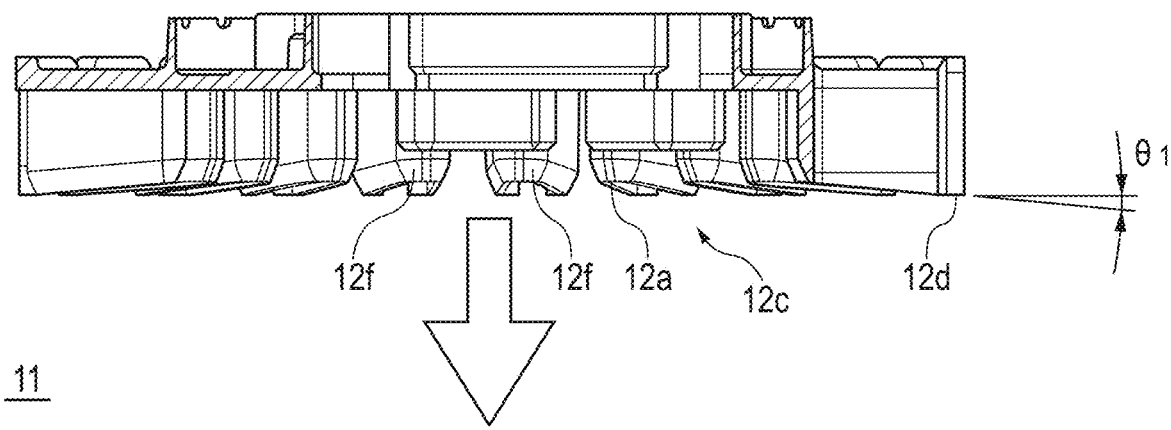
FIG. 3 is a cross-sectional view of the stator core and each insulator taken along a line III-III in FIG. 2.
Figure 3:
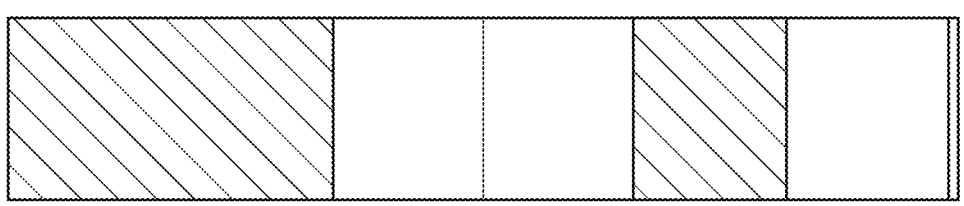
Figure 3:
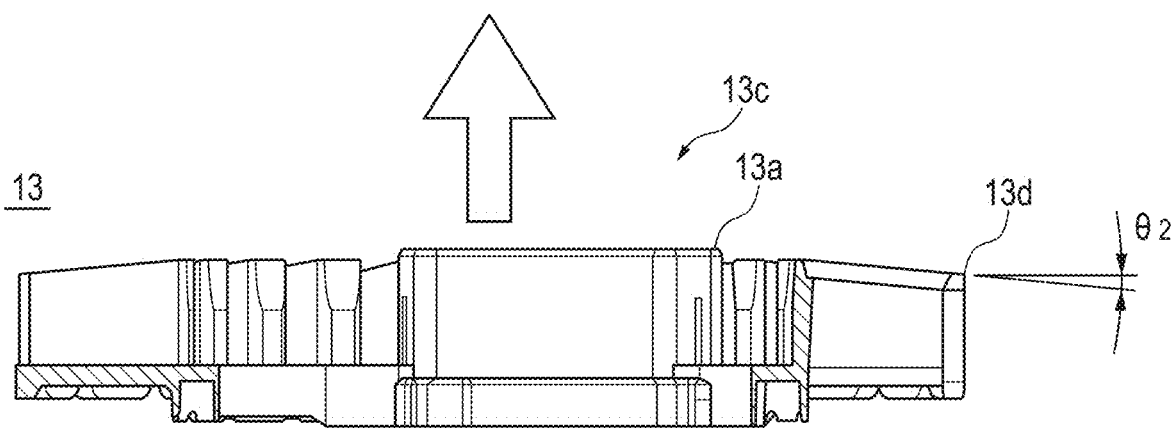

FIG. 3 is a cross-sectional view of the stator core 11 and the insulators 12, 13 taken along a line III-III in FIG. 2.

In FIG. 3, in a facing portion 12c of the insulator 12 facing the insulator 13 (facing portion facing the second insulator), a peripheral portion 12d projects toward the insulator 13 more than the center portion 12a. In a facing portion 13c of the insulator 13 facing the insulator 12 (facing portion facing the first insulator), the center portion 13a projects toward the insulator 12 more than a peripheral portion 13d. That is, the facing portion 12c of the insulator 12 is recessed in a substantially mortar shape, and the facing portion 13c of the insulator 13 projects in a substantially truncated cone shape.

The facing portion 12c of the insulator 12 is uniformly inclined from the center portion 12a toward the peripheral portion 12d. An inclination angle of the facing portion 12c of the insulator 12, that is, an inclination angle $\theta 1$ from the peripheral portion 12d to the center portion 12a is set to 10° or less, and preferably set to 5°. The facing portion 13c of the insulator 13 is also uniformly inclined from the center portion 13a to the peripheral portion 13d. An inclination angle of the facing portion 13c of the insulator 13, that is, an inclination angle $\theta 2$ from the center portion 13a to the peripheral portion 13d is set to 10° or less, and preferably set to 5°.

It should be noted that the facing portion 12c faces the stator core 11 when the insulator 12 is mounted to the stator core 11, and the facing portion 13c faces the stator core 11 when the insulator 13 is mounted to the stator core 11.

Figure 4:
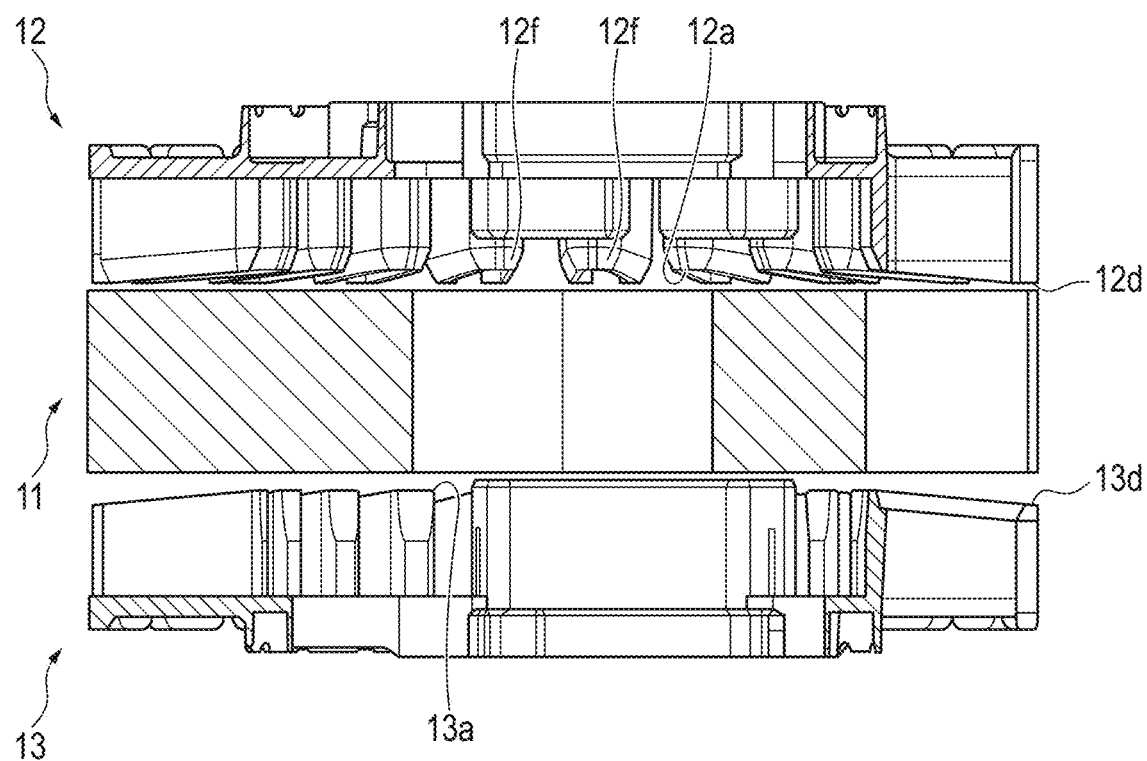
FIG. 4 is a cross-sectional view indicating a mode upon work of mounting each insulator to the stator core.

As indicated by arrows in FIG. 3, when the insulators 12, 13 are mounted to the stator core 11 so as to sandwich the stator core 11 therebetween, as described above, in the facing portion 12c of the insulator 12, the peripheral portion 12d projects. Therefore, first, the peripheral portion 12d engages with the stator core 11 (FIG. 4). At this time, a part (the lowermost end portion in the figure) of each tooth covering portion 12b located in the peripheral portion 12d engages with the corresponding tooth 11b. Further, as the insulator 12 moves toward the insulator 13, a part of each tooth covering portion 12b slides on a side surface of the tooth 11b and functions as a guide for the tooth 11b. Since the center portion 13a projects in the facing portion 13c of the insulator 13, first, the center portion 13a engages with the stator core 11 (FIG. 4). At this time, a part (the uppermost end portion in the figure) of each tooth covering portion 13b located in the center portion 13a engages with the corresponding tooth 11b. Further, as the insulator 13 moves toward the insulator 12, a part of each tooth covering portion 13b slides on the side surface of the tooth 11b and functions as a guide for the tooth 11b. As a result, work efficiency of mounting the insulator 12 and the insulator 13 to the stator core 11 can be improved. Finally, the facing portion 12c of the insulator 12 and the facing portion 13c of the insulator 13, which are mounted to the stator core 11, abut against each other.

Figure 5:
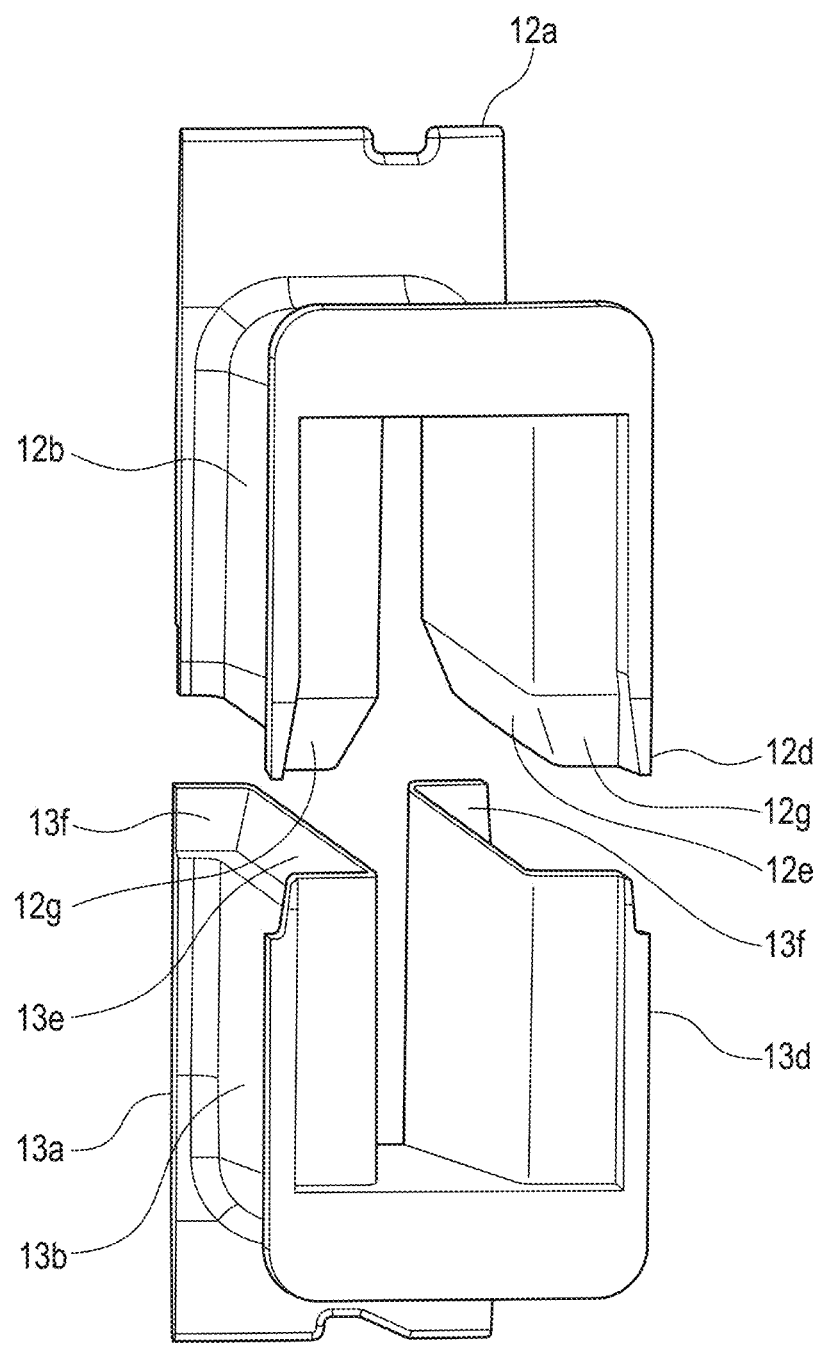
FIG. 5 is a perspective view showing a state in which a first tooth covering portion of the first insulator and a second tooth covering portion of the second insulator are separated from each other when viewed from a peripheral side of the first insulator and the second insulator.
Figure 6:
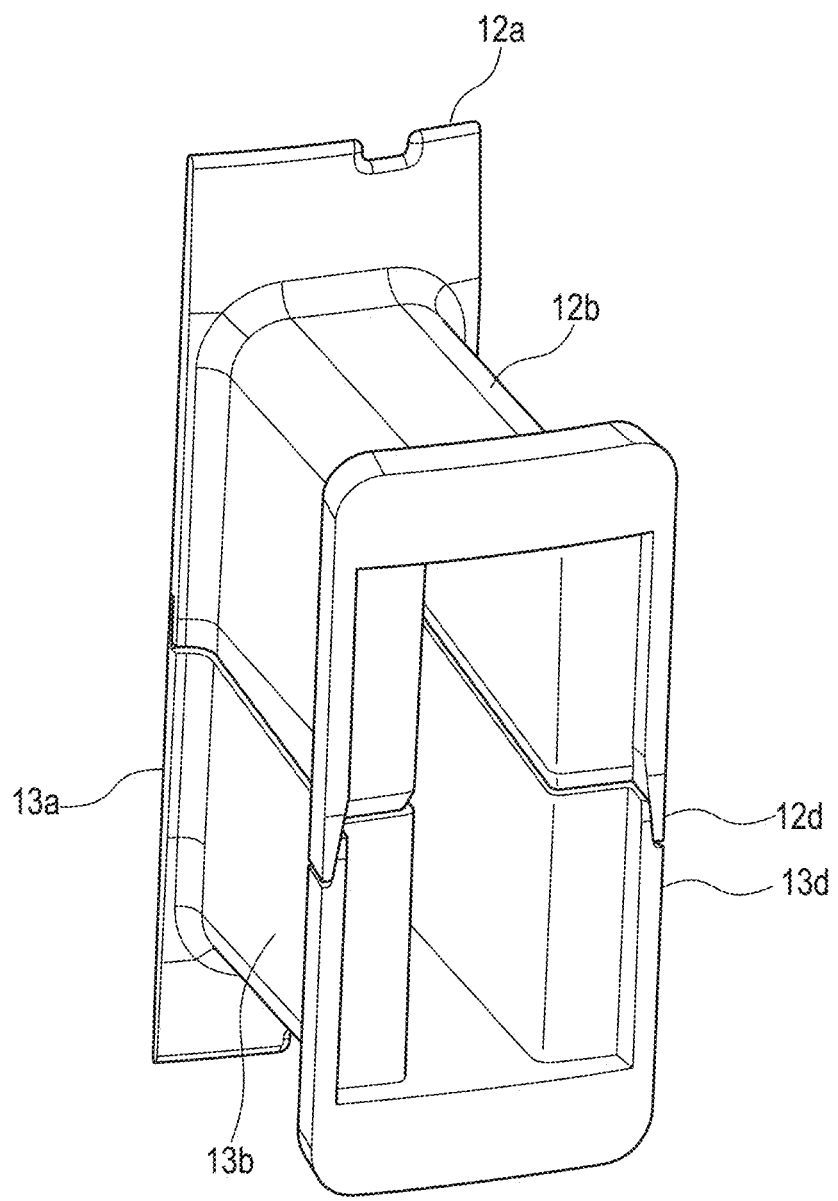
FIG. 6 is a perspective view showing a state in which the first tooth covering portion of the first insulator and the second tooth covering portion of the second insulator abut against each other when viewed from the peripheral side of the first insulator and the second insulator.
Figure 7:
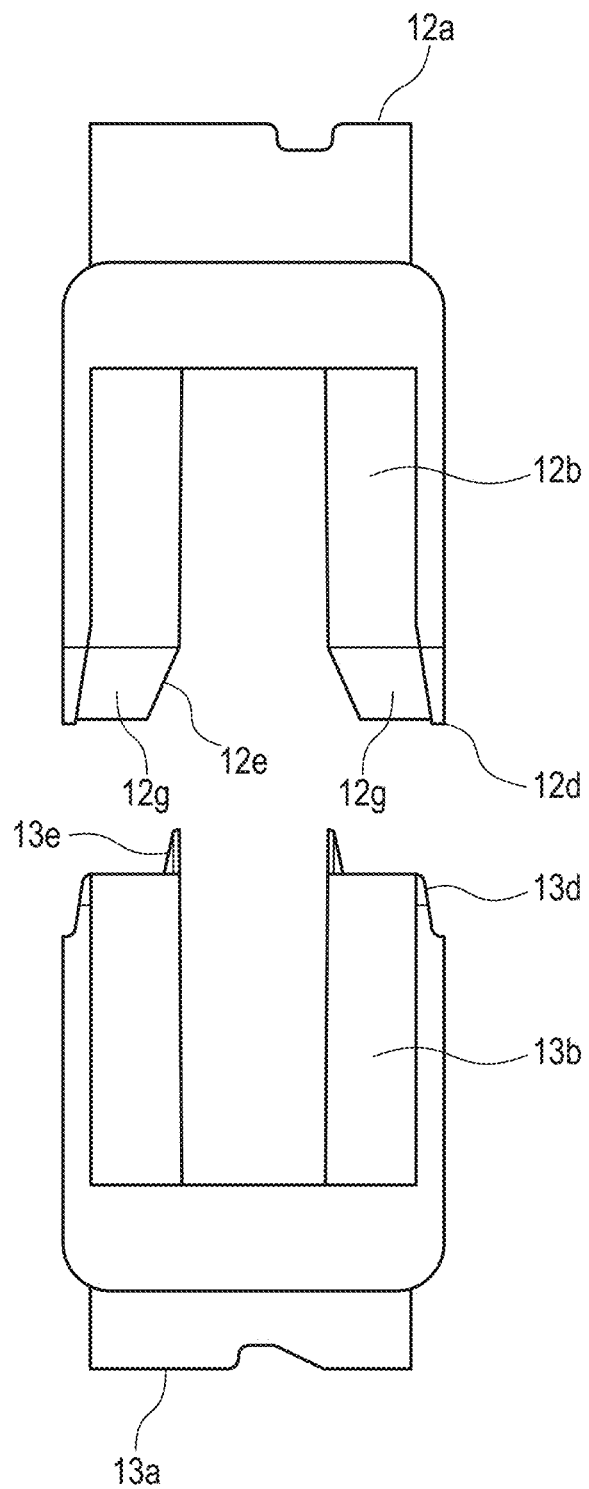
FIG. 7 is a front view showing a state in which the first tooth covering portion of the first insulator and the second tooth covering portion of the second insulator are separated from each other when viewed from the peripheral side of the first insulator and the second insulator.
Figure 8:
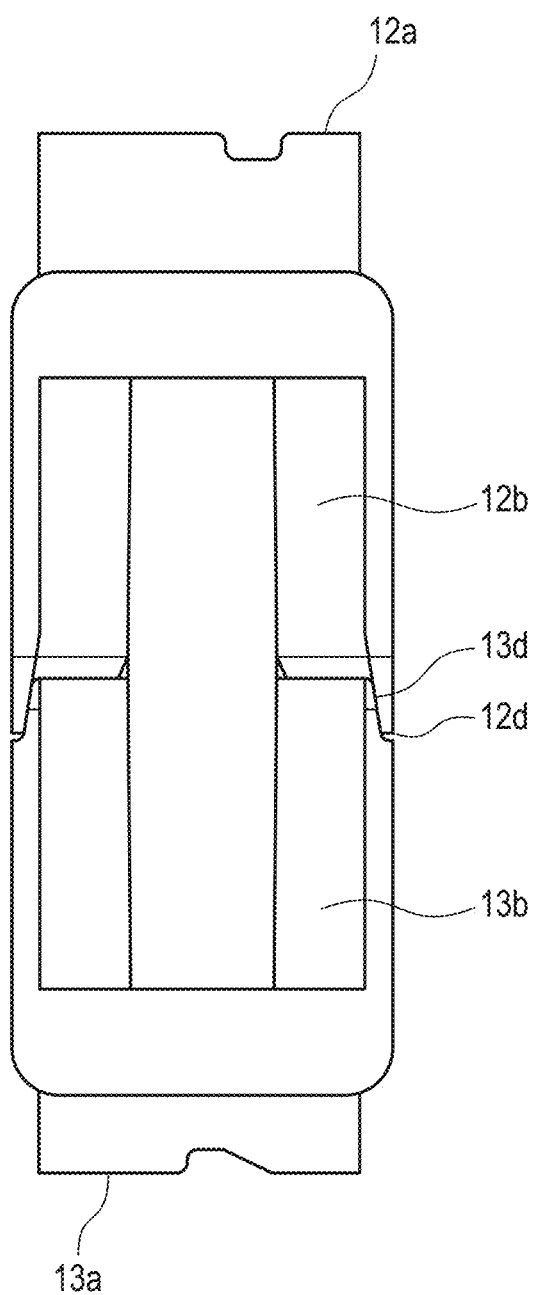
FIG. 8 is a front view showing a state in which the first tooth covering portion of the first insulator and the second tooth covering portion of the second insulator abut against each other when viewed from the peripheral side of the first insulator and the second insulator.
Figure 11:
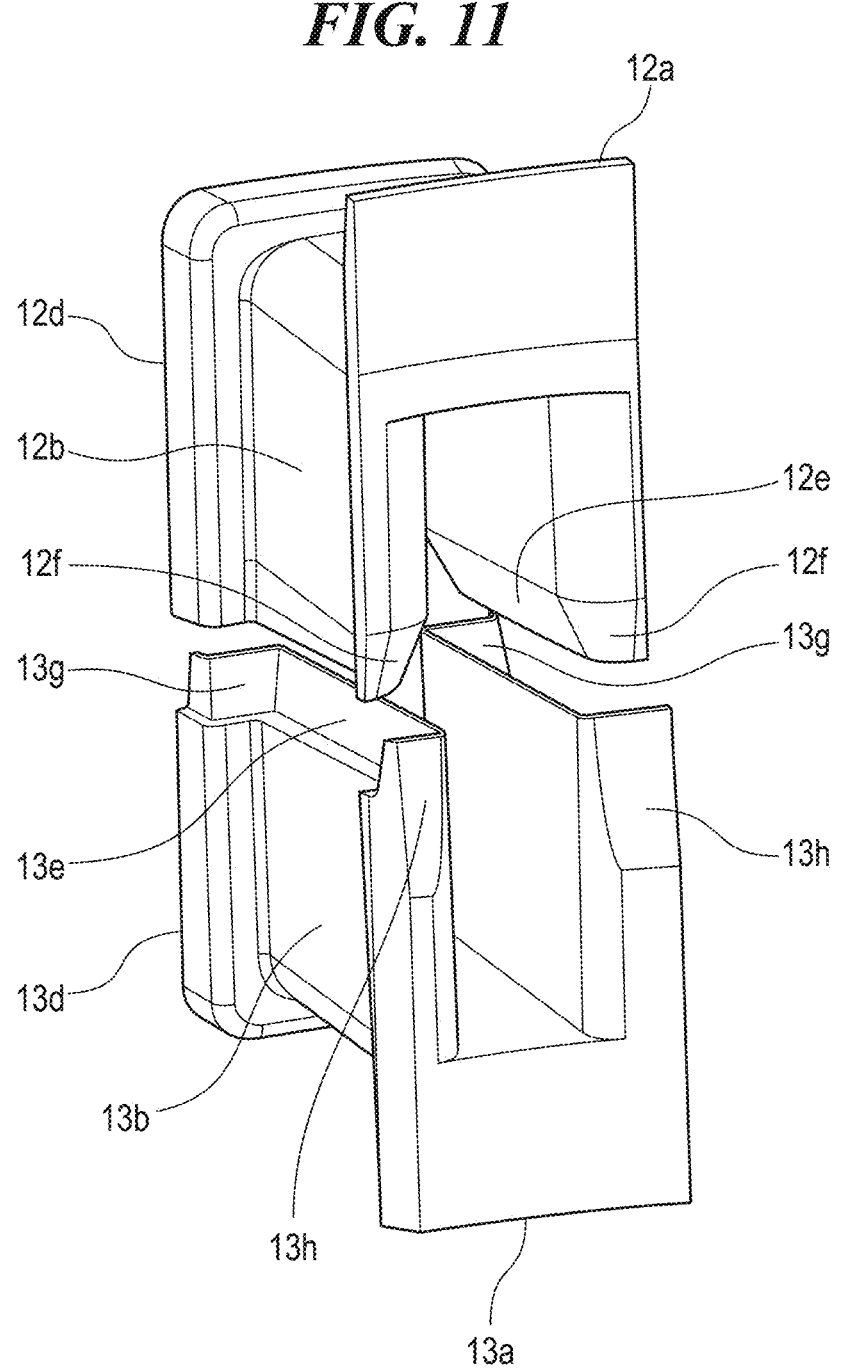
FIG. 11 is a perspective view showing a state in which the first tooth covering portion of the first insulator and the second tooth covering portion of the second insulator are separated from each other when viewed from a center side of the first insulator and the second insulator.

FIGS. 5, 6 and 11 are perspective views showing the configurations of the tooth covering portion 12b of the insulator 12 and the tooth covering portion 13b of the insulator 13. FIGS. 7 and 8 are front views showing the configurations of the tooth covering portion 12b of the insulator 12 and the tooth covering portion 13b of the insulator 13. Each of FIGS. 5, 6, 7, 8, and 11 shows only one tooth covering portion 12b and one tooth covering portion 13b.

In each of FIGS. 5, 6, 7, 8, and 11, the tooth covering portion 12b is a cover having a substantially rectangular tube shape projecting from the center portion 12a, and partially opened so as to be able to accommodate a part of the tooth 11b therein. Also, the tooth covering portion 13b is a cover having a substantially rectangular tube shape projecting from the center portion 13a, and partially opened so as to be able to accommodate a part of the tooth 11b therein (FIGS. 5, 7, and 11).

As described above, the facing portion 12c of the insulator 12 is recessed in a substantially mortar shape, and is uniformly inclined from the center portion 12a toward the peripheral portion 12d. Therefore, also a facing portion (hereinafter simply referred to as a "lower portion") (first end portion) of the tooth covering portion 12b facing the tooth covering portion 13b is uniformly inclined from the center portion 12a to the peripheral portion 12d without forming a corner therebetween. In addition, the facing portion 13c of the insulator 13 projects in a substantially truncated cone shape, and is uniformly inclined from the center portion 13a toward the peripheral portion 13d. Therefore, also a facing portion (hereinafter simply referred to as an "upper portion") (second end portion) of the tooth covering portion 13b facing the tooth covering portion 12b is uniformly inclined from the center portion 13a to the peripheral portion 13d without forming a corner therebetween, correspondingly to the lower portion of the tooth covering portion 12b.

Figure 12:
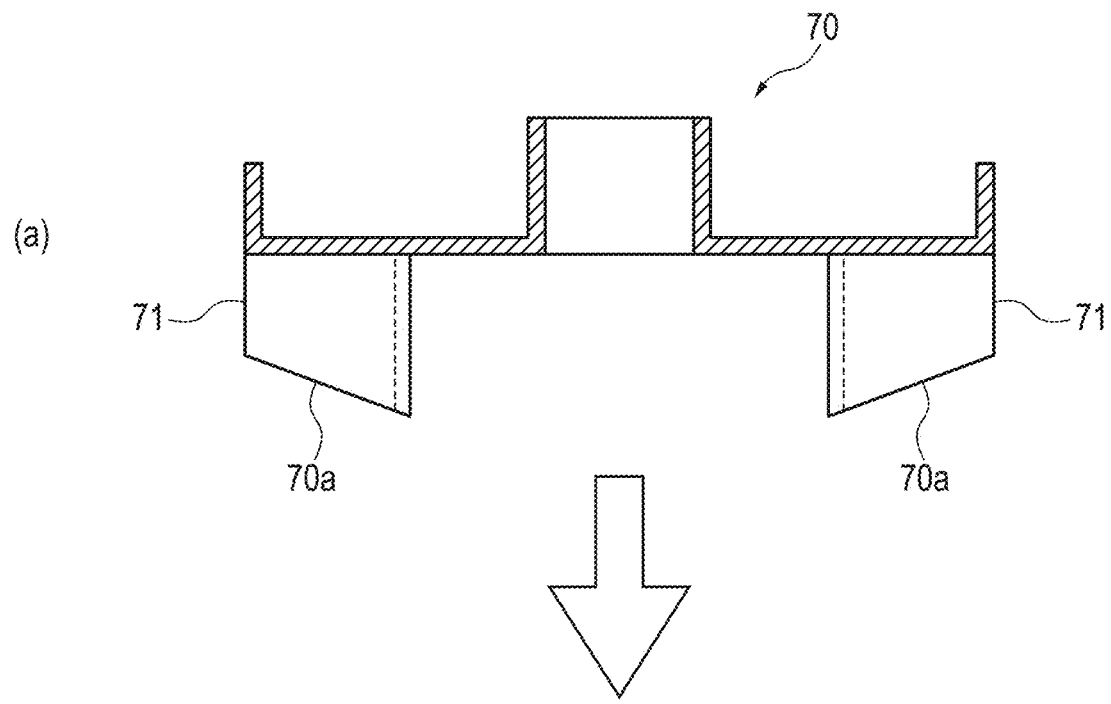
FIG. 12 is a cross-sectional view indicating a mode and a problem of an insulator in which ease of insertion of the stator into each slot is improved.
Figure 12:
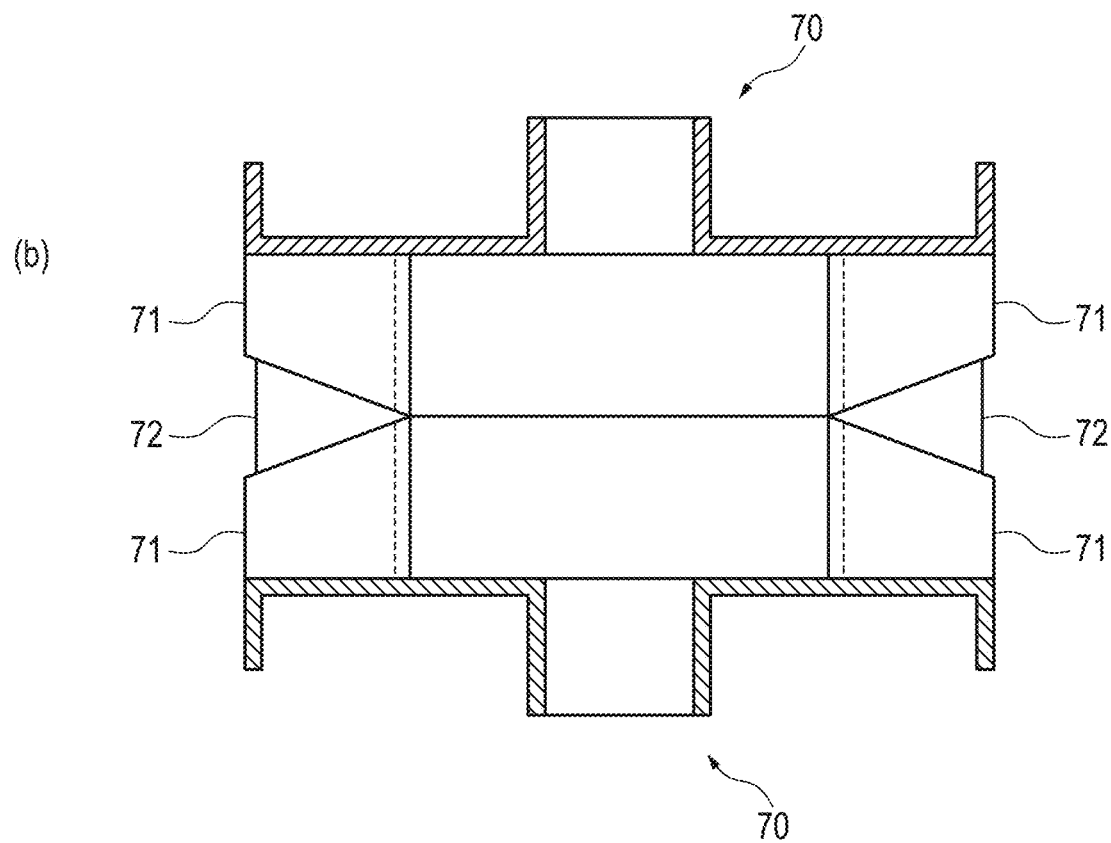

As shown in (a) in FIG. 12, it is conceivable to improve ease of insertion of each insertion portion 71 into each slot by inclining a front end portion 70a of each insertion portion 71 of each insulator 70 for sandwiching a stator core so as to projects more as proceeding toward the center portion of each insulator 70.

However, in a case where the stator core is sandwiched from above and below by the two insulators 70 in which the front end portion 70a of each insertion portion 71 that projects more as proceeding toward the center portion, a peripheral portion of each tooth 72 of the stator core is not covered with each insertion portion 71. Therefore, the peripheral portion of each tooth 72 is exposed ((b) in FIG. 12). As a result, there is risk that a coil wire wound around the tooth 72 with the insertion portion 71 interposed therebetween may contact the tooth 72 around which the coil wire is wound, and thus insulation failure occurs.

In contrast, in the present embodiment, the inclination angle from the center portion 12a to the peripheral portion 12d of the lower portion of the tooth covering portion 12b, the lower portion being uniformly inclined, and the inclination angle from the center portion 13a to the peripheral portion 13d of the upper portion of the tooth covering portion 13b, the upper portion being uniformly inclined, are set to be identical to each other. Therefore, when the insulators 12, 13 are mounted to the stator core 11, the lower portion of the tooth covering portion 12b and the upper portion of the tooth covering portion 13b abut against each other without a gap therebetween (FIGS. 6 and 8). As a result, the tooth covering portion 12b and the tooth covering portion 13b can completely cover the tooth 11b housed inside, and the insulation property of each tooth 11b of the stator core 11 can be improved.

The upper portion of the tooth covering portion 13b has a tapered shape that is tapered toward the tooth covering portion 12b. Specifically, a guide 13e formed by wall portions that are inwardly inclined as proceeding toward the tooth covering portion 12b is formed in the upper portion of the tooth covering portion 13b. The lower portion of the tooth covering portion 12b has a receptacle shape that widens as proceeding toward the tooth covering portion 13b correspondingly to the tapered shape of the upper portion of the tooth covering portion 13b. Specifically, a guide opening 12e formed by wall portions that are outwardly inclined as proceeding toward the tooth covering portion 13b is formed in the lower portion of the insulator 12.

When the lower portion of the tooth covering portion 12b and the upper portion of the tooth covering portion 13b abut against each other, the guide 13e of the tooth covering portion 13b is inserted into the guide opening 12e of the tooth covering portion 12b. As a result, the lower portion of the tooth covering portion 12b and the upper portion of the tooth covering portion 13b can be reliably engaged, and the tooth 11b can be reliably covered. Further, it is possible to prevent the tooth covering portion 12b from being displaced with respect to the tooth covering portion 13b.

Further, since the guide 13e is tapered as proceeding toward the tooth covering portion 12b and the guide opening 12e is widened as proceeding toward the tooth covering portion 13b, the guide 13e can be easily inserted into the guide opening 12e, and thus ease of combining the insulator 12 and the insulator 13 can be improved.

The guide 13e is configured by the wall portions that are inclined inward, and the guide opening 12e is configured by the wall portions that are inclined outward. Therefore, an integrated thickness of the insulator 12 and the insulator 13 at a fitting portion where the guide 13e is fitted to the guide opening 12e can be reduced. As a result, it is possible to increase a space for winding the coil wire around the tooth 11b and increase the number of turns of the coil 14.

A center-side guide 13f (see FIGS. 2 and 5) that is inclined toward the center of the insulator 13 as proceeding toward the tooth covering portion 12b is formed in an upper portion of the center portion 13a of the tooth covering portion 13b. A peripheral-side guide 13g (see FIGS. 2 and 11) that is inclined toward the periphery of the insulator 13 as proceeding toward the tooth covering portion 12b is formed in an upper portion of the peripheral portion 13d of the tooth covering portion 13b.

A center-side receiver 12f (see FIGS. 3, 4, and 11) that is inclined toward the periphery of the insulator 12 as proceeding toward the tooth covering portion 13b is formed in a lower portion of the center portion 12a of the tooth covering portion 12b. A peripheral-side receiver 12g (see FIGS. 2 and 5) that is inclined toward the center of the insulator 12 as proceeding toward the tooth covering portion 13b is formed in a lower portion of the peripheral portion 12d of the tooth covering portion 12b.

The inclination angle of the peripheral-side receiver 12g of the tooth covering portion 12b and the inclination angle of the peripheral-side guide 13g of the tooth covering portion 13b are substantially identical to each other. Therefore, when the lower portion of the tooth covering portion 12b and the upper portion of the tooth covering portion 13b abut against each other, the peripheral-side guide 13g guides the peripheral-side receiver 12g. The inclination angle of the center-side receiver 12f of the tooth covering portion 12b and the inclination angle of the center-side guide 13f of the tooth covering portion 13b are substantially identical to each other. Therefore, when the lower portion of the tooth covering portion 12b and the upper portion of the tooth covering portion 13b abut against each other, the center-side guide 13f guides the center-side receiver 12f. That is, the center-side receiver 12f, the peripheral-side receiver 12g, the center-side guide 13f, and the peripheral-side guide 13g can achieve similar effects as those of the guide opening 12e and the guide 13e.

Furthermore, in the upper portion of the center portion 13a of the tooth covering portion 13b, on the side opposite to the center-side guide 13f, that is, on the side facing the center portion 11a of the stator core 11, another center-side guide 13h (see FIG. 11) that is inclined toward the periphery of the insulator 13 as proceeding toward the tooth covering portion 12b is formed. Since the other center-side guide 13h is inclined toward the periphery of the insulator 13, the other center-side guide 13h functions as a guide for the center portion 11a of the stator core 11 when the center portion 13a of the insulator 13 engages with the stator core 11. As a result, the insulator 13 can be smoothly mounted to the stator core 11.

Figure 9A:
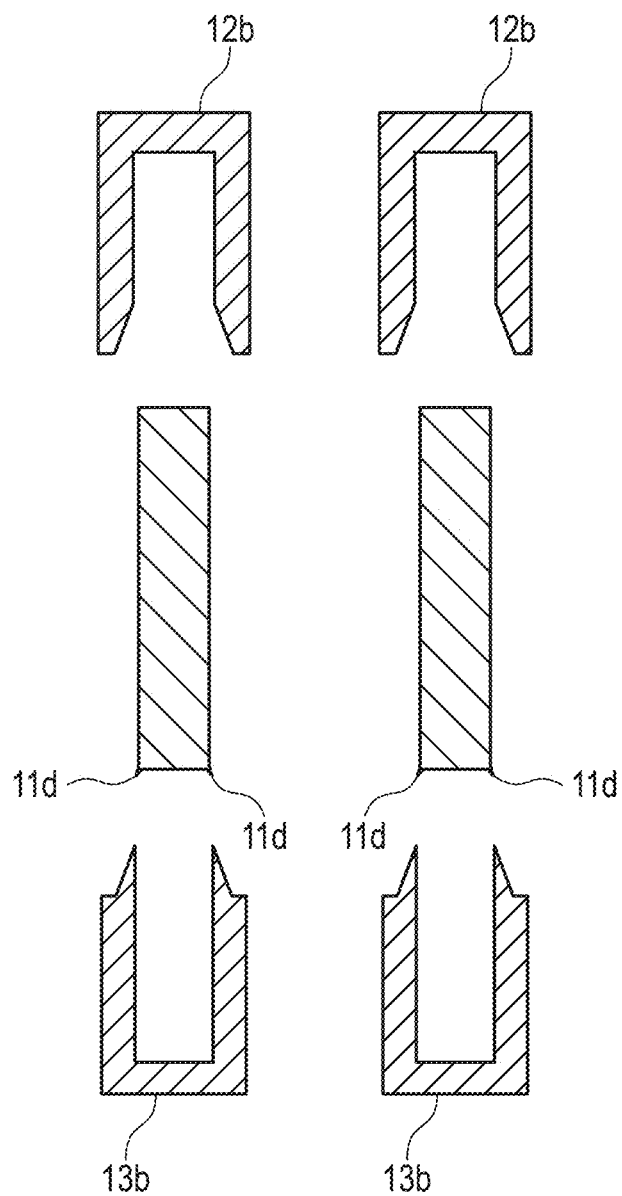
FIGS. 9A and 9B are process drawings indicating a problem in mounting the insulators to the stator core when a burr is formed on a tooth.
Figure 9B:
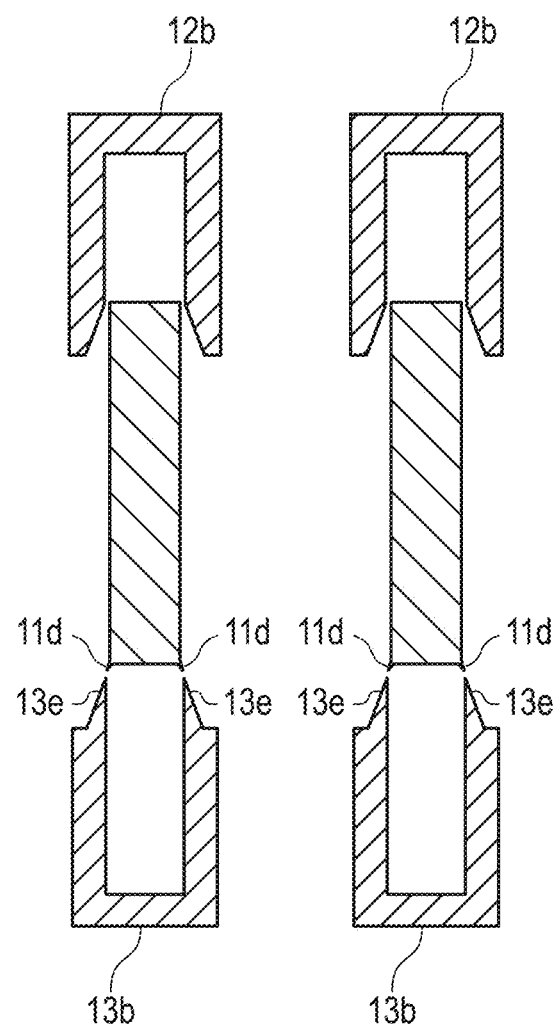

The stator core 11 is formed by stacking a large number of thin metal plates and punching the large number of thin metal plates that are stacked by a press. Therefore, a burr 11d may be formed at one end or the other end of each tooth 11b of the stator core 11 (FIG. 9A). Here, when the insulator 13 is mounted from the side where the burr 11d of the stator core 11 is formed (FIG. 9A), since the guide 13e of the tooth covering portion 13b is formed by the wall portions that are inclined inward, the guide 13e and the burr 11d interfere with each other. As a result, there is risk that the insulator 13 is not smoothly mounted to the stator core 11 (FIG. 9B).

Figure 10A:
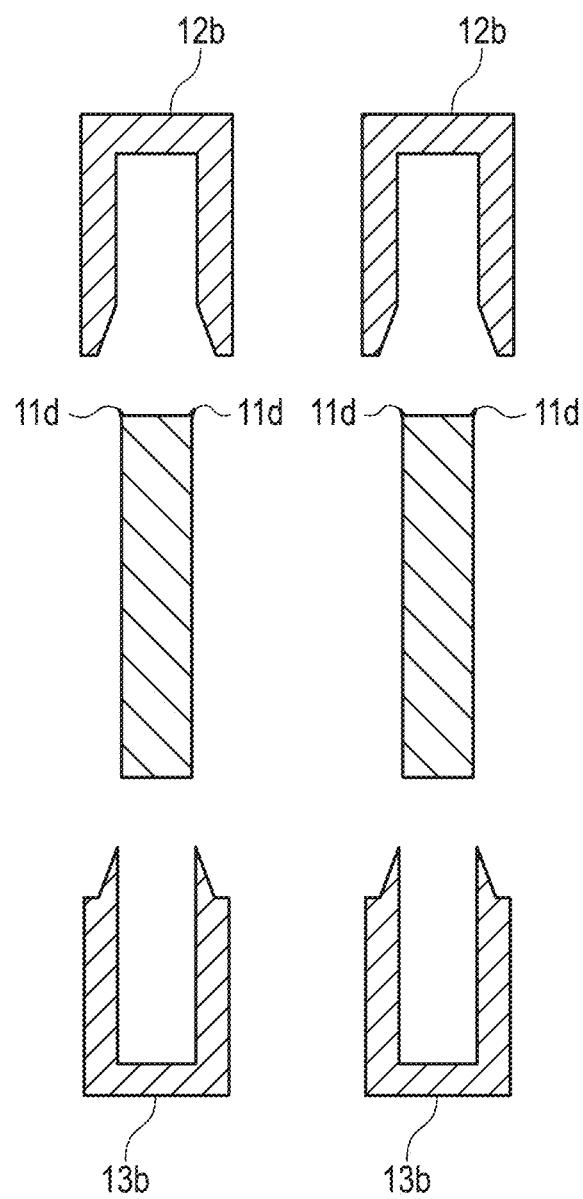
FIGS. 10A and 10B are process drawings indicating a method for mounting the insulators to the stator core when a burr is formed on the tooth.
Figure 10B:
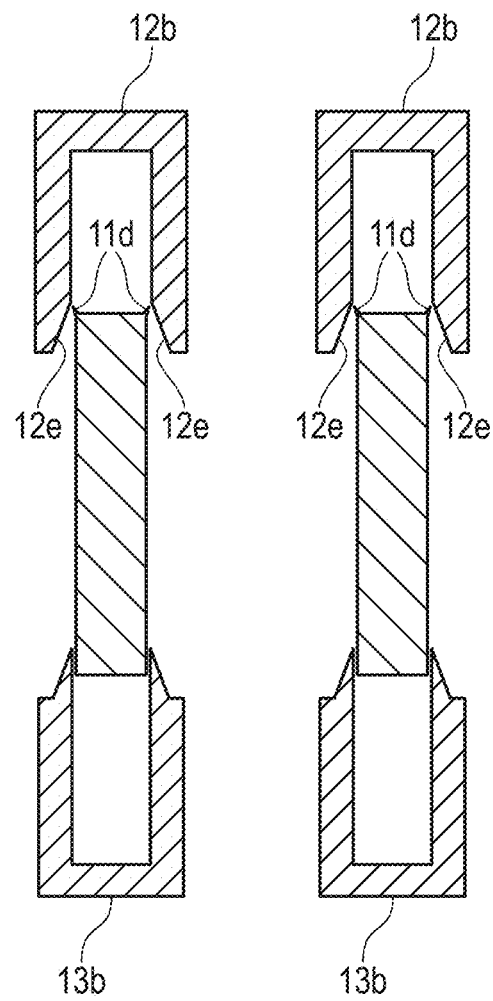

In the present embodiment, in order to cope with this, the insulator 12 is mounted from the side of the stator core 11 where the burr 11d is formed (FIG. 10A). Since the guide opening 12e of the tooth covering portion 12b of the insulator 12 widens as proceeding toward the tooth covering portion 13b, the burr 11d is less likely to interfere with the insulator 12 and the insulator 12 can be smoothly mounted to the stator core 11 (FIG. 10B). As a result of mounting the insulator 12 to the stator core 11, each tooth covering portion 12b covers the side of each tooth 11b where the burr 11d is formed.

Further, as described above, the center-side receiver 12f of the tooth covering portion 12b is inclined toward the periphery of the insulator 12 as proceeding toward the tooth covering portion 13b. The peripheral-side receiver 12g of the tooth covering portion 12b is inclined toward the center of the insulator 12 as proceeding toward the tooth covering portion 13b. Therefore, similarly to the guide opening 12e, the center-side receiver 12f and the peripheral-side receiver 12g are less likely to interfere with the burr 11d, and can contribute to smooth mounting of the insulator 12 to the stator core 11.

Although a preferred embodiment of the present invention has been described above, the present invention is not limited to the above-described embodiment, and various modifications and changes can be made within the scope of the gist of the present invention.

For example, in the present embodiment, the upper portion of each tooth covering portion 13b of the insulator 13 has a tapered shape; however, the lower portion of each tooth covering portion 12b of the insulator 12 may have a tapered shape. In this case, the upper portion of each tooth covering portion 13b has a receptacle shape that widens as proceeding toward the tooth covering portion 12b. Furthermore, a guide or a guide opening may not be formed in the lower portion of each tooth covering portion 12b or the upper portion of each tooth covering portion 13b.

Moreover, in the present embodiment, the lower portion of the tooth covering portion 12b and the upper portion of the tooth covering portion 13b abut against each other without a gap therebetween. However, a gap so small that a coil wire cannot enter even if the coil wire is warped may be formed between the lower portion of the tooth covering portion 12b and the upper portion of the tooth covering portion 13b. That is, the lower portion of the tooth covering portion 12b and the upper portion of the tooth covering portion 13b do not necessarily have to abut against each other without a gap therebetween.

This application claims the benefit of Japanese Patent Application No. 2019-196225 filed on Oct. 29, 2019 which is hereby incorporated by reference herein in its entirety.

What is claimed is:

1. An insulator set including a first insulator and a second insulator that sandwich a stator core therebetween, wherein
   the stator core includes a plurality of teeth that radially projects from a center portion of the stator core,
   the first insulator includes a plurality of first tooth covering portions that radially projects from a center portion of the first insulator,
   the second insulator includes a plurality of second tooth covering portions that radially projects from a center portion of the second insulator,
   the plurality of first tooth covering portions and the plurality of second tooth covering portions cover the plurality of teeth,
   in a facing portion of the first insulator that faces the second insulator, a peripheral portion of the first insulator projects toward the second insulator more than the center portion of the first insulator, and
   in a facing portion of the second insulator that faces the first insulator, the center portion of the second insulator projects toward the first insulator more than a peripheral portion of the second insulator.

2. The insulator set according to claim 1, wherein when the first insulator and the second insulator sandwich the stator core therebetween, the facing portion of the first insulator that faces the second insulator abuts against the facing portion of the second insulator that faces the first insulator.

3. The insulator set according to claim 1, wherein the facing portion of the first insulator that faces the second insulator is uniformly inclined from the center portion of the first insulator to the peripheral portion of the first insulator, and the facing portion of the second insulator that faces the first insulator is uniformly inclined from the center portion of the second insulator to the peripheral portion of the second insulator.

4. The insulator set according to claim 1, wherein a first end portion serving as a facing portion of each of the plurality of first tooth covering portions that faces each of the plurality of second tooth covering portions is inclined, and a second end portion serving as a facing portion of each of the plurality of second tooth covering portions that faces each of the plurality of first tooth covering portions is inclined correspondingly to the first end portion.

5. The insulator set according to claim 4, wherein the second end portion has a tapered shape, and the first end portion has a receptacle shape corresponding to the tapered shape.

6. The insulator set according to claim 4, wherein an inclination angle of the first end portion and an inclination angle of the second end portion are set to be identical to each other, the first end portion and the second end portion abut against each other without a gap therebetween, and thereby the plurality of first tooth covering portions and the plurality of second tooth covering portions cover the entirety of the plurality of teeth.

7. The insulator set according to claim 4, wherein
   the second end portion of each of the plurality of second tooth covering portions in the center portion of the second insulator includes a center-side guide that is inclined toward a center of the second insulator as proceeding toward each of the plurality of first tooth covering portions,
   the second end portion of each of the plurality of second tooth covering portions in the peripheral portion of the second insulator includes a peripheral-side guide that is inclined toward a periphery of the second insulator as proceeding toward each of the plurality of first tooth covering portions,
   the first end portion of each of the plurality of first tooth covering portions in the center portion of the first insulator includes a center-side receiver that is inclined toward a periphery of the first insulator as proceeding toward each of the plurality of second tooth covering portions, and
   the first end portion of each of the plurality of first tooth covering portions in the peripheral portion of the first insulator includes a peripheral-side receiver that is inclined toward a center of the first insulator as proceeding toward each of the plurality of second tooth covering portions.

8. The insulator set according to claim 7, wherein another center-side guide that is inclined toward the periphery of the second insulator as proceeding toward each of the plurality of first tooth covering portions is formed in the second end portion of each of the plurality of second tooth covering portions in the center portion of the second insulator, on a side opposite to the center-side guide.

9. The insulator set according to claim 1, wherein each of the plurality of first tooth covering portions of the first insulator covers a side of each of the plurality of teeth of the stator core on which a burr is formed.

10. A stator comprising:
a stator core; and
an insulator set,
wherein the insulator set includes a first insulator and a second insulator that sandwich the stator core therebetween,
the stator core includes a plurality of teeth that radially projects from a center portion of the stator core,
the first insulator includes a plurality of first tooth covering portions that radially projects from a center portion of the first insulator,
a second insulator includes a plurality of second tooth covering portions that radially projects from a center portion of the second insulator,
the plurality of first tooth covering portions and the plurality of second tooth covering portions cover the plurality of teeth,
in a facing portion of the first insulator that faces the second insulator, a peripheral portion of the first insulator projects toward the second insulator more than the center portion of the first insulator, and
in a facing portion of the second insulator that faces the first insulator, the center portion of the second insulator projects toward the first insulator more than a peripheral portion of the second insulator.

11. A method for manufacturing a stator including a stator core and an insulator set which includes a first insulator and a second insulator that sandwich the stator core therebetween, wherein
the stator core includes a plurality of teeth that radially projects from a center portion of the stator core,
the first insulator includes a plurality of first tooth covering portions that radially projects from a center portion of the first insulator,
a second insulator includes a plurality of second tooth covering portions that radially projects from a center portion of the second insulator,
the plurality of first tooth covering portions and the plurality of second tooth covering portions cover the plurality of teeth,
in a facing portion of the first insulator that faces the second insulator, a peripheral portion of the first insulator projects toward the second insulator more than the center portion of the first insulator,
in a facing portion of the second insulator that faces the first insulator, the center portion of the second insulator projects toward the first insulator more than a peripheral portion of the second insulator, and
the method comprises:
mounting the first insulator to the stator core from a side where a burr is formed on each of the plurality of teeth of the stator core, and
mounting the second insulator to the stator core.

12. The method for manufacturing the stator according to claim 11, wherein
a second end portion serving as a facing portion of each of the second tooth covering portions that faces each of the first tooth covering portions has a tapered shape, and a first end portion serving as a facing portion of each of the first tooth covering portions that faces each of the second tooth covering portions has a receptacle shape correspondingly to the tapered shape.

13. The method for manufacturing the stator according to claim 12 comprising:
including a center-side guide that is inclined toward a center of the second insulator as proceeding toward each of the plurality of first tooth covering portions, in the second end portion of each of the plurality of second tooth covering portions in the center portion of the second insulator;
including a peripheral-side guide that is inclined toward a periphery of the second insulator as proceeding toward each of the plurality of first tooth covering portions, in the second end portion of each of the plurality of second tooth covering portions in the peripheral portion of the second insulator;
including a center-side receiver that is inclined toward a periphery of the first insulator as proceeding toward each of the plurality of second tooth covering portions, in the first end portion of each of the plurality of first tooth covering portions in the center portion of the first insulator; and
including a peripheral-side receiver that is inclined toward a center of the first insulator as proceeding toward each of the plurality of second tooth covering portions, in the first end portion of each of the plurality of first tooth covering portions in the peripheral portion of the first insulator.

* * * * *